United States Patent
Bartholomew et al.

(10) Patent No.: US 9,785,806 B2
(45) Date of Patent: Oct. 10, 2017

(54) LOW-FREQUENCY RECEIVING FOR RADIO FREQUENCY IDENTIFICATION

(71) Applicant: IMSAR LLC, Springville, UT (US)

(72) Inventors: David Baird Bartholomew, Springville, UT (US); Gus Ryan German, Fountain Green, UT (US); Ryan Lee Smith, Birdseye, UT (US); Caleb Hunter Chamberlain, Payson, UT (US)

(73) Assignee: IMSAR LLC, Springville, UT (US)

( * ) Notice: Subject to any disclaimer, the term of this patent is extended or adjusted under 35 U.S.C. 154(b) by 0 days.

(21) Appl. No.: 14/990,518

(22) Filed: Jan. 7, 2016

(65) Prior Publication Data

US 2016/0203347 A1 Jul. 14, 2016

Related U.S. Application Data

(60) Provisional application No. 62/101,868, filed on Jan. 9, 2015.

(51) Int. Cl.
*G06K 7/08* (2006.01)
*G06K 7/10* (2006.01)
(Continued)

(52) U.S. Cl.
CPC ..... *G06K 7/10158* (2013.01); *G06K 7/10207* (2013.01); *G06K 19/0723* (2013.01); *G08B 21/18* (2013.01); *H04B 5/0062* (2013.01)

(58) Field of Classification Search
CPC ........... G06K 7/10158; G06K 19/0723; G06K 7/10207; H04B 5/0062; G08B 21/18
(Continued)

(56) References Cited

U.S. PATENT DOCUMENTS 6,657,586 B2 12/2003 Turner
7,198,227 B2 4/2007 Olin et al.
(Continued)

FOREIGN PATENT DOCUMENTS

WO 2007102784 A1 9/2007

OTHER PUBLICATIONS

Bhattacharya, Indrajit et al., "Optimal Placement of Readers in an RFID Network Using Particle Swarm Optimization", International Journal Networks & Communications (IJCNC), vol. 2, No. 6, pp. 225-234 (Nov. 2010).
(Continued)

*Primary Examiner* — Dhaval Patel

(57) ABSTRACT

A radio frequency identification (RFID) tag includes a power source, a transmitter to transmit a unique identifier, and a receiver operatively coupled to the transmitter and to receive low-frequency signals from an active RFID transceiver located in the vicinity. The transmitter is activated by the power source responsive to the receiver receiving a wake up command at a predetermined low frequency from the active RFID transceiver. An RFID transceiver includes an antenna, non-transitory computer-readable medium storing instructions and a transmitter to transmit low-frequency signals to RFID tags through the antenna. A processing device of the RFID transceiver can execute the instructions to insert a station identifier (ID) into the low-frequency signals that direct the RFID tags to retransmit the station ID, wherein the station ID identifies an approximate location of the RFID tags.

24 Claims, 12 Drawing Sheets

(51) Int. Cl.
*G08B 21/18* (2006.01)
*H04B 5/00* (2006.01)
*G06K 19/07* (2006.01)

(58) Field of Classification Search
USPC ............ 340/539.2, 10.1, 10.4, 10.34, 10.51,
340/539.13, 539.23, 572.1, 572.2, 572.4;
235/382, 440
See application file for complete search history.

(56) References Cited

U.S. PATENT DOCUMENTS

| | | | |
|---|---|---|---|
| 7,324,824 B2 | 1/2008 | Smith et al. | |
| 7,339,470 B2 | 3/2008 | Scott | |
| 7,667,572 B2 | 2/2010 | Husak et al. | |
| 7,817,014 B2 | 10/2010 | Krishna et al. | |
| 8,068,023 B2 * | 11/2011 | Dulin | B60P 3/03 340/539.11 |
| 8,269,609 B2 | 9/2012 | O'Hern | |
| 8,456,282 B2 * | 6/2013 | Burkart | G06K 19/0701 340/10.34 |
| 2007/0018793 A1 | 1/2007 | Stewart et al. | |
| 2007/0176748 A1 | 8/2007 | Salamitou | |
| 2008/0224867 A1 * | 9/2008 | Rehman | G06Q 10/08 340/572.1 |
| 2010/0164690 A1 | 7/2010 | Raphaeli et al. | |
| 2011/0080264 A1 | 4/2011 | Clare et al. | |
| 2011/0150046 A1 | 6/2011 | Mo | |
| 2011/0248833 A1 * | 10/2011 | Ritamaki | G06K 19/0705 340/10.33 |
| 2012/0223814 A1 | 9/2012 | Kawaguchi et al. | |
| 2012/0256730 A1 | 10/2012 | Scott et al. | |
| 2013/0030931 A1 | 1/2013 | Moshfeghi | |
| 2014/0126442 A1 * | 5/2014 | Jafarian | H04W 52/0212 370/311 |
| 2015/0054621 A1 * | 2/2015 | Lin | G06K 7/10198 340/10.1 |
| 2015/0102102 A1 * | 4/2015 | Heim | G07C 9/00103 235/382 |

OTHER PUBLICATIONS

Maday, John, "Tag Tech," accessed at http://www.cattlenetwork.com/drovers/features/tag-tech-113919709.html/ on Jan. 17, 2011.
"Southfork Solutions, Inc.," accessed at http://southforksolutions.com/About.asp/ on Dec. 8, 2014.
Arnold, Michelle, "Animal Disease Traceability: Knowing an Animal's Path," University of Kentucky College of Agriculture, accessed at http://www.cattlenetwork.com/cattle-news/Animal-disease-traceability-knowing-ananimals-path-142379225.html/ on Mar. 12, 2012.
Michigan Department of Agriculture & Rural Development, "Michigan Cattle Official ID Options," https://www.michigan.gov/documents/mdard/ATTACHMENT_E_-7_Cattle_Official_ID_Options_449241_7.pdf, 1 page, accessed May 26, 2015.

* cited by examiner

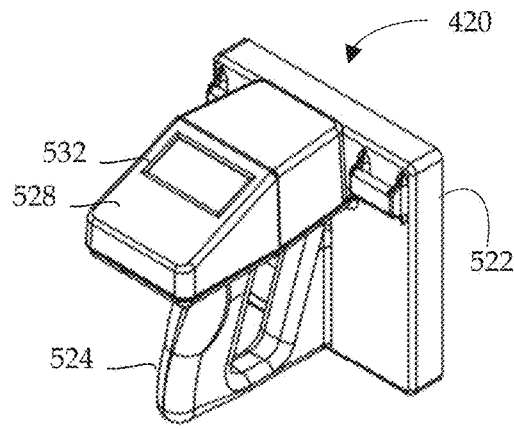
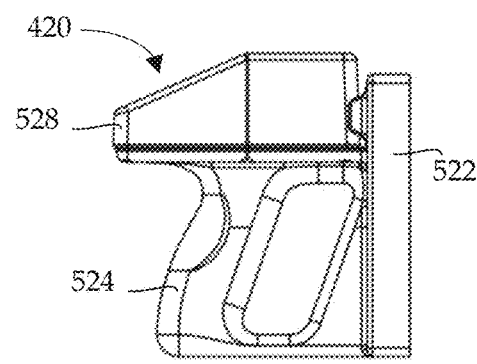
*FIG. 5A*              *FIG. 5B*
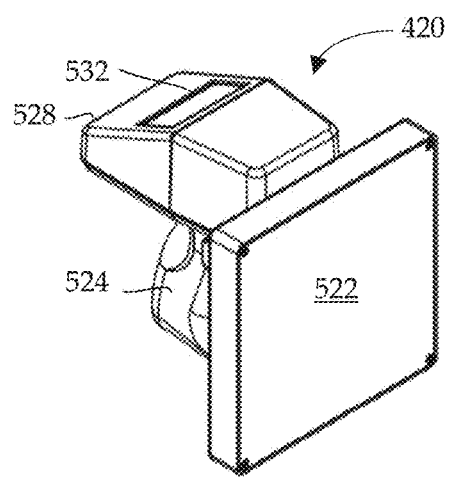
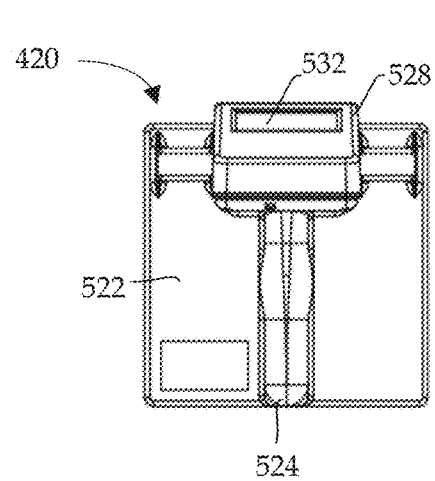
*FIG. 5C*              *FIG. 5D*

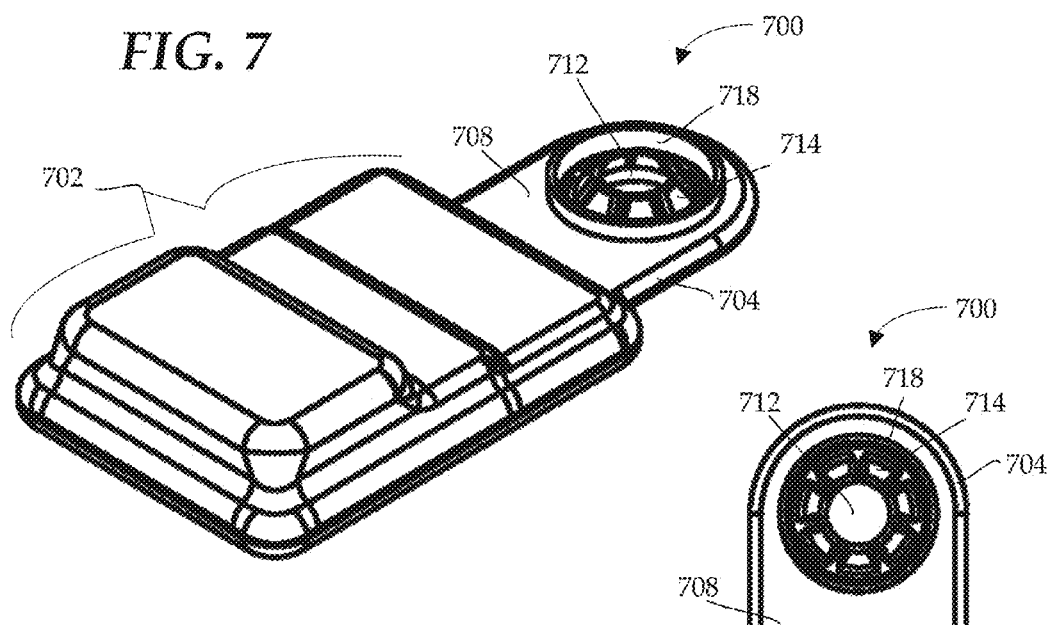
*FIG. 7*
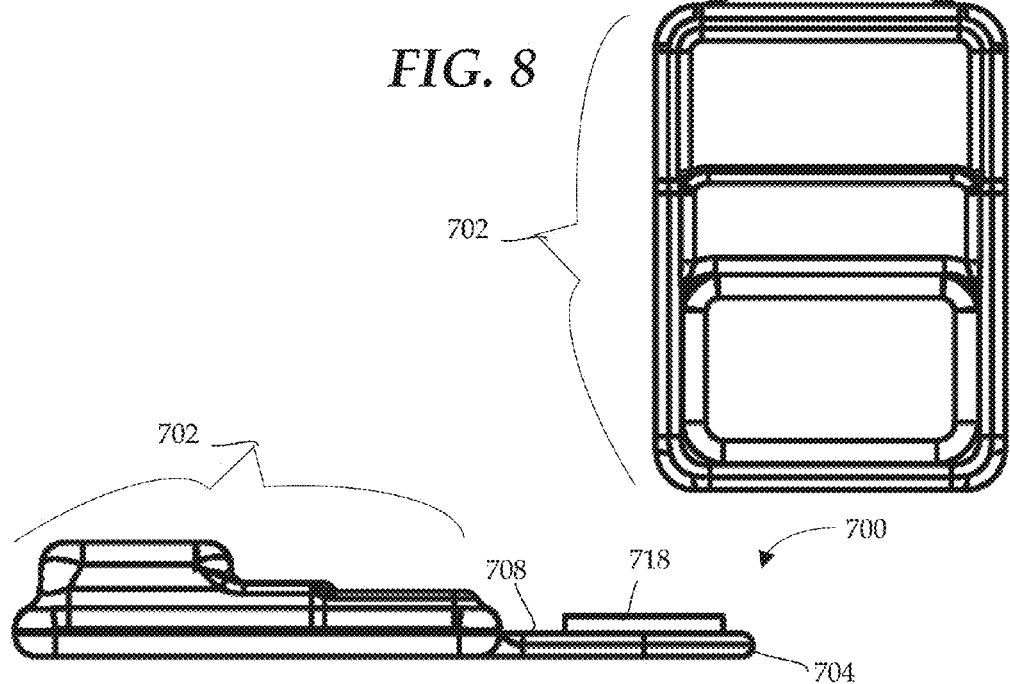
*FIG. 8*
*FIG. 9*

LOW-FREQUENCY RECEIVING FOR RADIO FREQUENCY IDENTIFICATION

RELATED APPLICATIONS

This application claims the benefit of U.S. Provisional Application No. 62/101,868, filed Jan. 9, 2015, the entire contents of which are incorporated by this reference.

BACKGROUND

Radio frequency identification (RFID) systems have been used to track inventory, such as in a store. The inventory amount can be reduced as items containing RFID tags pass an RFID interrogator at time of purchase, for example. RFID tags can be either passive or active.

Passive RFID tags are interrogated with a radio frequency power source that bounces off of the passive tags, where the return signal uniquely identifies the tagged object with an RFID identifier (ID). In contrast, active RFID tags contain a power source (usually a battery) and can radiate an identifying radio signal, and are also known as RFID transmitter tags. A reader can receive and record such a signal, thus identifying the tagged object. Because passive tags have no power source, interrogating readers need to be in relatively close proximity to interrogate and read the passive tags. More expensive active tags, however, can be read from a greater distance, but which still has distance limits (such as within a few hundred meters depending on the power source).

Radio frequency ID tags are used in other industries as well. An RFID tag attached to an automobile during production can be used to track its progress through the assembly line. Pharmaceuticals can be tracked through warehouses. Even livestock and pets can have tags injected to facilitate positive identification of animals.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIGS. 5A, 5B, 5C and 5D are several perspective views of the hand-held RFID tracker of FIG. 4, according to one embodiment.

FIG. 7 is a perspective view of an RFID tag housing according to one embodiment of the present disclosure.

FIG. 8 is a top perspective view of the RFID tag housing of FIG. 7.

FIG. 9 is a side perspective view of the RFID tag housing of FIG. 7.

DETAILED DESCRIPTION

By way of introduction, the present disclosure explains that a radio frequency identification (RFID) tag can be woke up through a low-frequency signal and can communicate with other RFID readers in the vicinity, to help determine and track locations of RFID tags. A RFID transceiver can send a wake up signal through the low-frequency signal to such RFID tags, and can also send other commands or information through high-frequency signals to direct the RFIDS tags once the RFID tags are awake.

The present disclosure further explains how assets such as those found on a farm or ranch, on railcars or on transport trucks, for example, can be monitored and tracked over time in relation to inventory and environmental conditions through the RFID tags. For example, data (both tag-related and environmental-related data) from the RFID tags on such assets can be collected with transceivers and provided to a user who can make a decision regarding the assets based on the presented data. As some assets can be far reaching and take paths over a wide area, certain algorithms and methods are employed to detect the RFID tags on the assets, determine where the assets are located during which periods of time, and provide path or heat signature graphs on maps indicative of historical movement of each asset of interest. Trends can be established, which when varied from, can be indicative of health problems or other issues that can be flagged before becoming a real threat (like a diseased cow, for example).

In one embodiment, an RFID tag includes a power source and a transmitter to transmit a unique identifier. The tag also includes a receiver operatively coupled to the transmitter and to receive low-frequency signals from an active RFID transceiver located within a vicinity of the receiver, e.g., within tens of feet away. The transmitter is activated by the power source responsive to the receiver receiving a wake up command at a predetermined low frequency. For example, the frequency of the wake up command can be about 150 KHz or less.

In another embodiment, a RFID transceiver includes an antenna and non-transitory computer-readable medium storing instructions. The RFID transceiver can also include a transmitter to transmit low-frequency signals to RFID tags through the antenna, and a processing device operatively coupled to the transmitter. The processing device can execute the instructions to insert a station identifier (ID) into the low-frequency signals that direct the RFID tags to retransmit the station ID, wherein the station ID identifies an approximate location of the RFID tags that are located in the vicinity of the RFID transceiver.

Figure 1A:
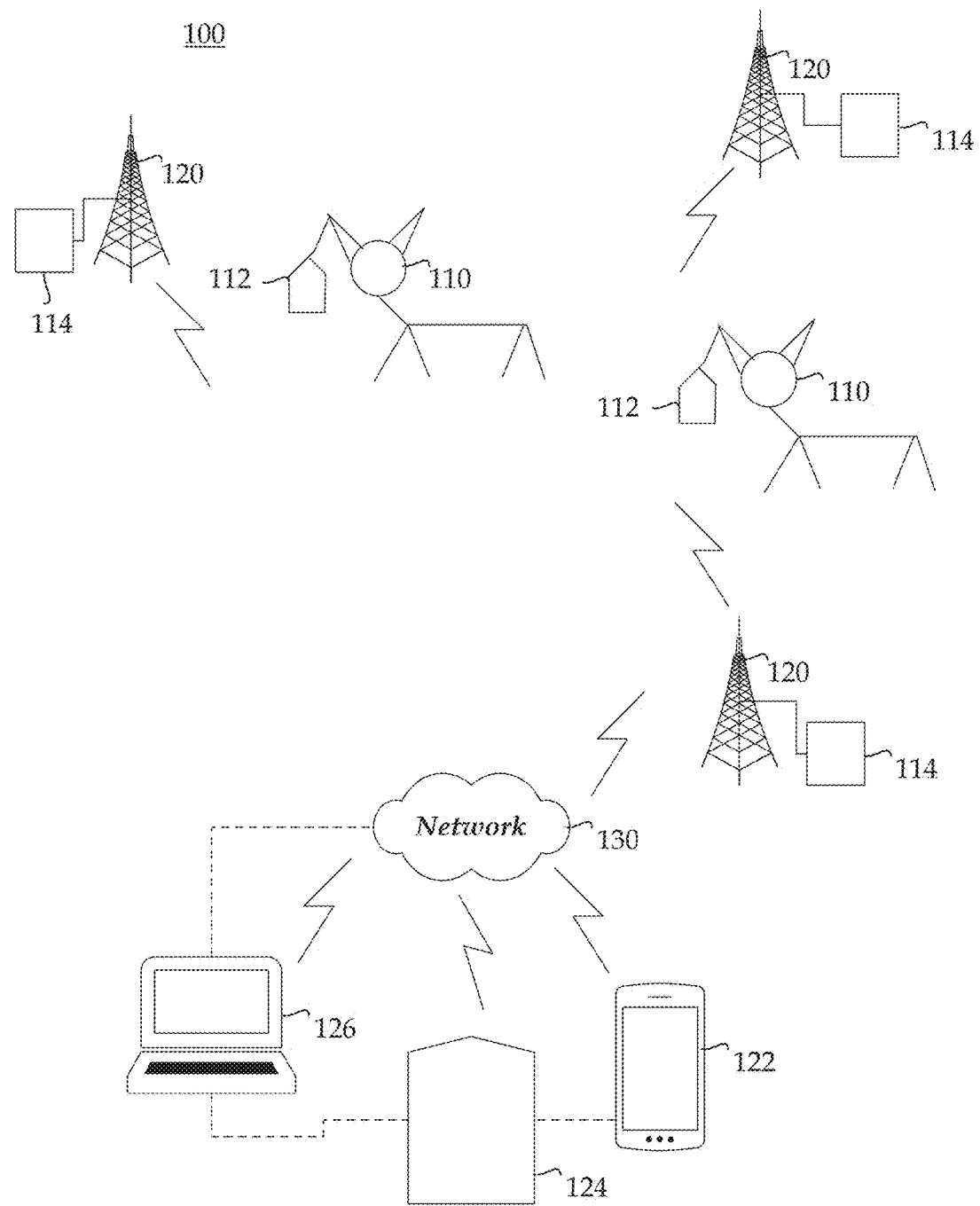
FIG. 1A is a system diagram of long-range radio frequency identification (RFID) of assets using multiple RFID transceivers, according to one embodiment.
Figure 4:
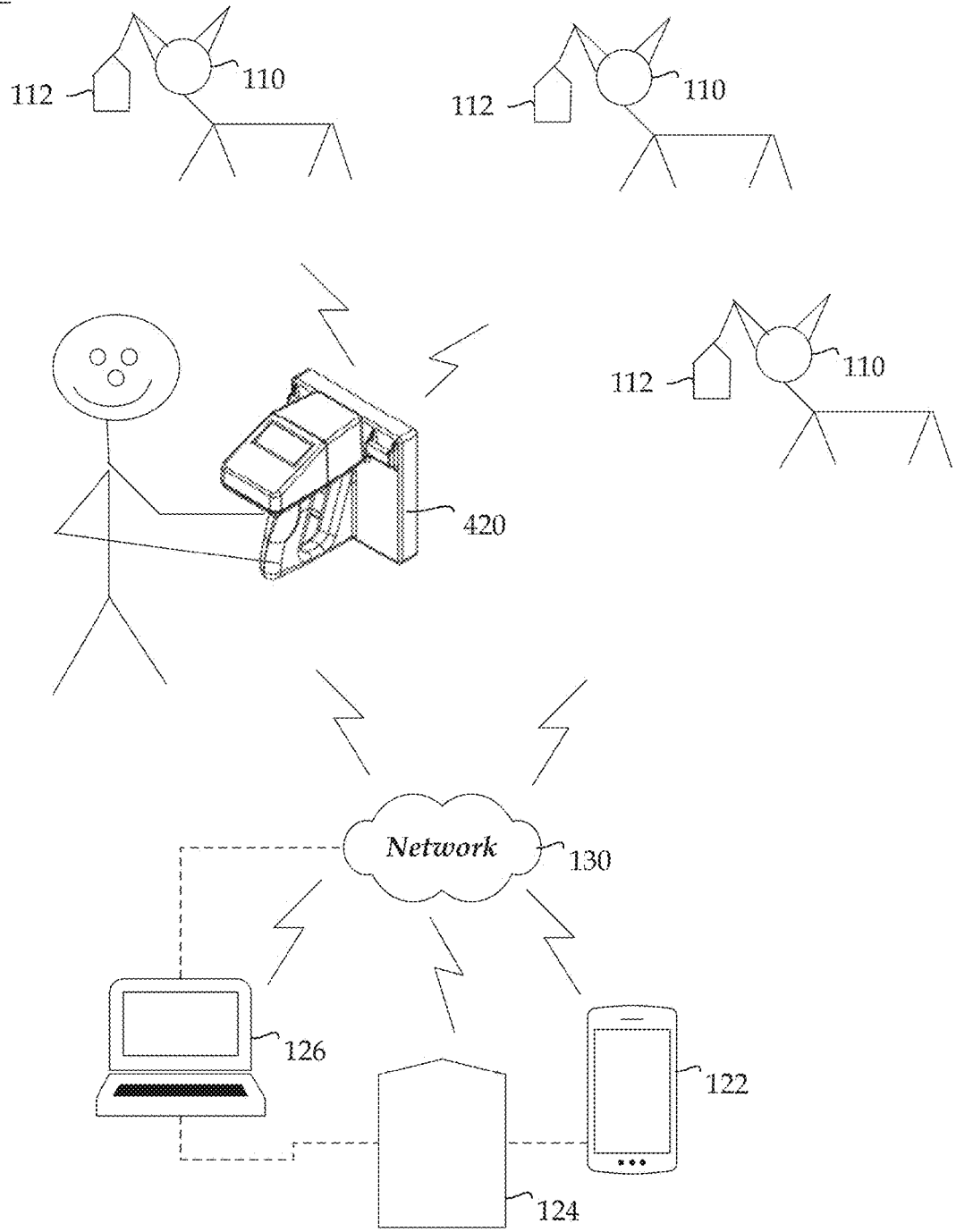
FIG. 4 is a system diagram of radio frequency identification of moving assets using a hand-held RFID tracker, according to another embodiment of the present disclosure.

FIG. 1A displays a system 100 for long-range radio frequency identification (RFID) of assets 110 using multiple transceiver towers 120 (also referred to herein as transceivers 120), which can also be mobile RFID transceivers 220 (FIG. 2) or hand-held trackers 420 (FIG. 4). Each asset 110 can be an animal (such as livestock), equipment (such as a tractor, all-terrain vehicle (ATVs), farm vehicles, computers and the like), fence posts and irrigation components, and other such assets. Each asset 110 can be tagged with an RFID transmitter tag 112 capable of transmitting at long distances as well as at shorter distances. The RFID transmitter tags 112 will alternatively be referred to herein as RFID tags 112 or simply as tags 112.

Figure 1B:
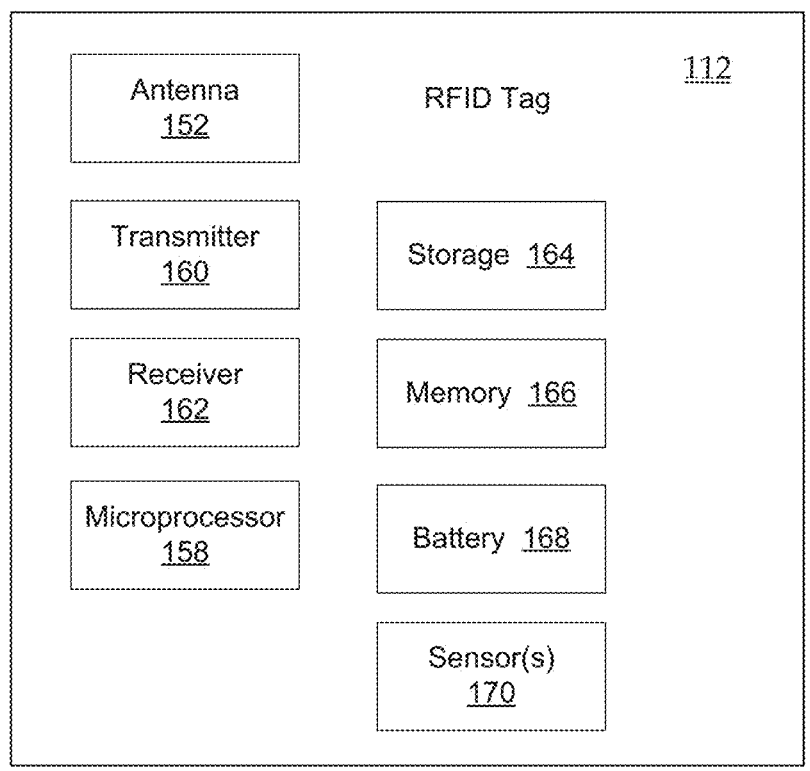
FIG. 1B is a system diagram of an example RFID tag used in the system of FIG. 1A, according to one embodiment of the present disclosure.

FIG. 1B is a system diagram of an example RFID tag 112 used in the system 100 of FIG. 1A. The RFID tag 112 can include an antenna 152, a microprocessor 158 (also referred to herein as simply a processor 158), a transmitter 160, a receiver 162, computer storage 164, memory 166, a battery 168 and one or more sensors 170. The RFID tag 112 can be intelligent, e.g., capable of sending and or/receiving radio signals at different frequencies for different purposes (or different assets) and capable of storing collected data for retrieval by the system 100 at a later time. The RFID tag 112 can also process the data using the microprocessor 158 and the memory 166. The RFID tag 112 can be powered by the battery 168 or other electrical energy storage or conversion system (such as solar), and can transmit spontaneously, e.g., the RFID transmitter tags 112 need not be activated by a reader system or interrogator to initiate transmission. The RFID tag 112 can also be turned on or signaled remotely by an interrogator or RFID transceiver as will be discussed in more detail. The sensors 170 can gather environmental information, which can include temperature, blood pressure or other vital signs of an animal, and the like. Such environmental data can also be stored in the computer storage 164 of the tag.

The receiver 162 can detect signals at short ranges but consume significantly less power than an active RFID signal receiver (such as the transceivers 120 of FIG. 1A, for example). Accordingly, the receiver 162 can be turned on for much longer time periods without draining the battery 168 of RFID tag. The receiver 162 can be activated with a low duty-cycle command (e.g., less than 50% duty cycle) so that it is off more of the time to reduce power consumption. As a result, the probability of the RFID tag 112 detecting a low-frequency signal transmission can be much higher than the probability of detecting an active RFID signal transmission at a high frequency. This makes the low-frequency signal transmission useful for generating low-latency responses from RFID tags at shorter ranges because command signals do not need to be resent many times to increase the probability of detection at the RFID tag.

More particularly, the RFID tag 112 can respond to low-frequency signal detection by processing data in the signal, executing pre-stored instructions, sending an active RFID transmission, or changing its behavior (such as to transmit at a different frequency for a period of time, transmit less frequently or transmit more frequently). In one embodiment, an RFID tag 112 receives a unique identifier (ID) such as a station ID in a low-frequency signal from one of the RFID transceivers 120 located within a close range (within tens of feet and less than a mile, for example). In one embodiment, the low-frequency is around 150 KHz or less and may depend on application.

The RFID tag 112 can detect the station ID in the low-frequency signal and treat the station ID as a wake up command. The RFID tag 112 can then become activated with the battery powering its several components, and begin transmitting the station ID of the transceiver that placed the RFID tag 112 into the active state. The station ID can be packaged in a special packet type readable by other RFID reading devices. Accordingly, these other RFID reading devices in the vicinity of the RFID tag 112 can detect the station ID and mark the RFID tag 112 as being at a location near the transceiver 120 carrying the station ID. The RFID transceivers 120 can also record the wake up of the RFID tag 112, and track its location. The RFID transceivers 120 can further communicate with or read the RFID tag 112 using an electromagnetic field. Accordingly, the RFID tag 112 may be a combination of a passive and an active RFID tag, and able to act as both depending on the conditions and the commands received from the RFID transceivers 120.

The signal transmission of the RFID transceivers 120 can further include high-frequency (or ultra-high frequency) signals such as between 14 MHz and 960 MHz, for example, which can be modulated with data to contain commands to the tag, information about the identity of the activating transmitter, or other sensory data. This allows the RFID tags 112 to receive a wake-up command from a low-frequency activation signal and other data from high-frequency signals that can be processed as commands or used to generate unique responses after the RFID tag has awakened.

Accordingly, the RFID tags 112 can be activated with a low-frequency signal transmission containing the station ID and a short transmission radius to immediately produce an active RFID transmission from a single RFID tag. The active RFID transmission response can include the station ID from the low-frequency signal transmission to indicate that it is located in close proximity to an activating station, such as to the RFID transceiver towers 120, multiple mobile RFID transceiver 220 (FIG. 2), or to a hand-held tracker 420 (FIG. 4), which will be discussed in more detail. When the activating station position is known, this information can be used to detect the presence of an RFID tag 112 in a known, precise location.

In one embodiment, a close range RFID transceiver (such as the RFID mobile transceiver 220 or the hand-held tracker 420) can send the low-frequency activation signal that wakes up a tag while a long range RFID transceiver (such as the RFID transceiver tower 120 or the RFID mobile transceiver 220) can send the high-frequency signals that can carry other data and commands, and to also track the location of the tag.

The transmission power level of the low-frequency signal from the RFID transceivers 120, 220 or 420 can be reduced to cover a small area such as a doorway, gate, animal chute, scale or a measurement device. For example, low-frequency activation used in close proximity to measurement devices such as scales, food, water, medication, or nutritional supplement dispensers can uniquely link the measurement to a unique RFID to identify the animal that is being measured, fed, or treated.

The transmission power level of the low-frequency signal can be increased to cover a wider area such as a pen, alley, or pasture section. The range of low-frequency signal detection is a combination of the transmitter power and antenna gain and the sensitivity of the receiver 162. Low-frequency activation of RFID tags 112 can be used to count or collect inventory of tagged animals in feedlots, auction houses, loading or unloading lanes wide enough for multiple animals to pass at once, holding pens, at premise entrances or exits where move-in/move-out records are desired. The high probability of low-frequency detection and long-range ability of active RFID transmission can produce very efficient and reliable inventory and counting of RFID tags 112. This is the case at least because there is much more interference at high frequencies that are used for many more modern day applications. Low frequency bands, on the other hand, are not as overwhelmed by interference and therefore attenuate less quickly.

Because the active RFID transmission range is much farther than that of traditional RFID tags in a passive state, the active RFID transceivers 120, 220, 420 can be located farther from the RFID tags 112 than a low-frequency transmitter and can cover a much larger area. This reduces the cost and simplifies complexity of the system 100 by reducing the number of RFID transceivers and eliminates the need to deploy transceivers in a low-frequency activating station or to connect data cables or wireless backhaul datalinks to low-frequency activating stations.

With further reference to FIG. 1A, there are preferably more than one RFID transceiver 120 so that the greatest number of assets can be tracked over the greatest distance. The RFID transceivers 120, 220 and 420 can include a coupled processing and storage unit 114 that can analyze collected RFID and environmental data, and store the data before the data is sent to system computing devices over a network 130. The network 130 can be cellular, wireless, wired or a combination of all three, as will be discussed in more detail. The computing devices can include mobile devices 122 (such as a smartphone, tablet, etc.), a computer 126 (such as a desktop or laptop computer) and other display and/or audio devices 124 capable of announcing or presenting the tracked data to users of the system 100. The display and/or audio devices 124 can be coupled to or in communication with a mobile device or a computer.

The RFID transceivers 120, 220 and 420 can include event-timing resources that measure the time of arrival (TOA) of RFID tag transmissions from the RFID tags 112 with known locations, timings, and timing offsets. Alternatively, or additionally, the RFID transceivers 120, 220 and 420 can include one or more processors or other logic for acquiring and/or computing the angle of arrival (AOA) to the receiver of the RFID signal originating from RFID tags 112.

With the TOA and/or the AOA, the processing and storage units 114 can determine the location of the RFID tags 112, or this information can be sent to the computing devices 122 and/or 126 that in turn determine the location of the RFID tags 112. Along with sensor and environmental data, the historical locations tracked over time can demonstrate trends, behaviors, motion, dwell, entrance, exit, environmental conditions, and other such information about each asset 110 corresponding to respective RFID tags 112. As will be discussed, these trends can be provided in an accessible manner for users to notice and to take action depending on any disturbing trends or anomalies on previous trends.

The RFID tag 112 can transmit an identifying packet approximately once a minute. At least three RFID transceivers 120, 220 or 420 can be placed strategically about an area of interest. The RFID transceivers can measure the time of arrival (TOA) of the transmission to the receiver. Processing electronics of the RFID transceivers 120, 220 or 420 can be in communication with timing information given by an attached global positioning system (GPS) receiver that is adapted to track time and location. In this way, each receiver can obtain access to accurate global time. The TOA information and the identifying number from a tag transmission can be combined and sent to an application server, such as the computer 126 in FIG. 1A.

The application server can use the timing information from the three RFID transceivers, map elevation data, and the speed of radio waves to mathematically determine the location of the RFID tag and therefore the attached asset 110. The RFID tag 112 can also transmit additional desired status information to the transceivers 120, 220 or 420. The server can log the location and status information and present the data on webpages or computer applications for users to access, e.g., in reports and/or on a map of the desired area as will be explained in more detail.

One method of determining the location of an RFID tag 112 from three or more transceivers is as follows. Let $[t_{R1}, t_{R2}, t_{R3}, \ldots t_{RN}]$ be the time of arrival at towers 1 through N that are located at $r_i=[r_{ix}, r_{iy}, r_{iz}]$, where coordinates $r_1, r_2, r_3, \ldots r_N$ are included in an elevation map giving the elevation coordinate at every (x, y) position defined by $f_{elevation}(x,y)=z$. The steps of the method can include the following steps, without limitation:

1) Compensate for any known time bias in the tower time of arrivals, $[t_{b1}, t_{b2}, t_{b3}, \ldots t_{bN}]$, e.g., timestamps=$[t_{R1}, t_{R2}, t_{R3}, \ldots t_{RN}]-[t_{b1}, t_{b2}, t_{b3}, \ldots t_{bN}]$.

2) Remove large time offsets in this compensation to create small time differences near zero, e.g, timestamps=timestamps−minimum ($[t_{R1}, t_{R2}, t_{R3}, \ldots t_{RN}]$). In this context, minimum refers to the earliest time of arrival at one of the towers and is determined by comparing arrival times with other towers. By removing this minimum time (essentially setting it to 0), the location of the tag can be determined using the remaining two variables instead of all three time offsets, which simplifies the processing. In other words, choose $t_{Ri}$ such that $t_{Ri}$ is less than or equal to any of $t_{R1}, t_{R2}, t_{R3}, \ldots t_{RN}$.

3) Convert time differences to distance differences using speed of signal propagation, e.g., c_timestamps=$[t_{R1}, t_{R2}, t_{R3}, \ldots t_{RN}]*c=[c*t_{R1}, c*t_{R2}, c*t_{R3}, \ldots c*t_{RN}]$ where c is the speed of light/signal propagation.

4) Initialize solution parameter set beta=$[x, y, c*t_s]$ where (x, y) are solution coordinates and $t_s$ is the time at which the signal transmission is sent, and where beta=$[x_0, y_0, 0]$ where $x_0, y_0$ are chosen nearby the expected solution area. For example, $x_0, y_0$ can be chosen as the coordinates of one of the towers or the average of all the tower coordinates.

5) Find the values of beta=$[x, y, c*t_s]$ that minimize the cost function f as follows:

beta=$[x, y, c*t_s]$=arg min(f)

f=sum($fi^2$) is the sum of the squares of $f_i$ cost components from each of N towers.

z=$f_{elevation}(x,y)=z$ is the elevation at coordinates (x,y) from the elevation map.

fi=sqrt$((r_{ix}-x)^2+(r_{iy}-y)^2+(r_{iz}-z)^2)-(c*t_{Ri}-c*t_s)$ is the error between the distance from solution coordinates (x, y, z) and tower i coordinates and the signal propagation distance during the time interval from $t_s$ to $t_{Ri}$.

6) The RFID tag location can be given by coordinates x, y, and z=$f_{elevation}(x,y)$.

Figure 2:
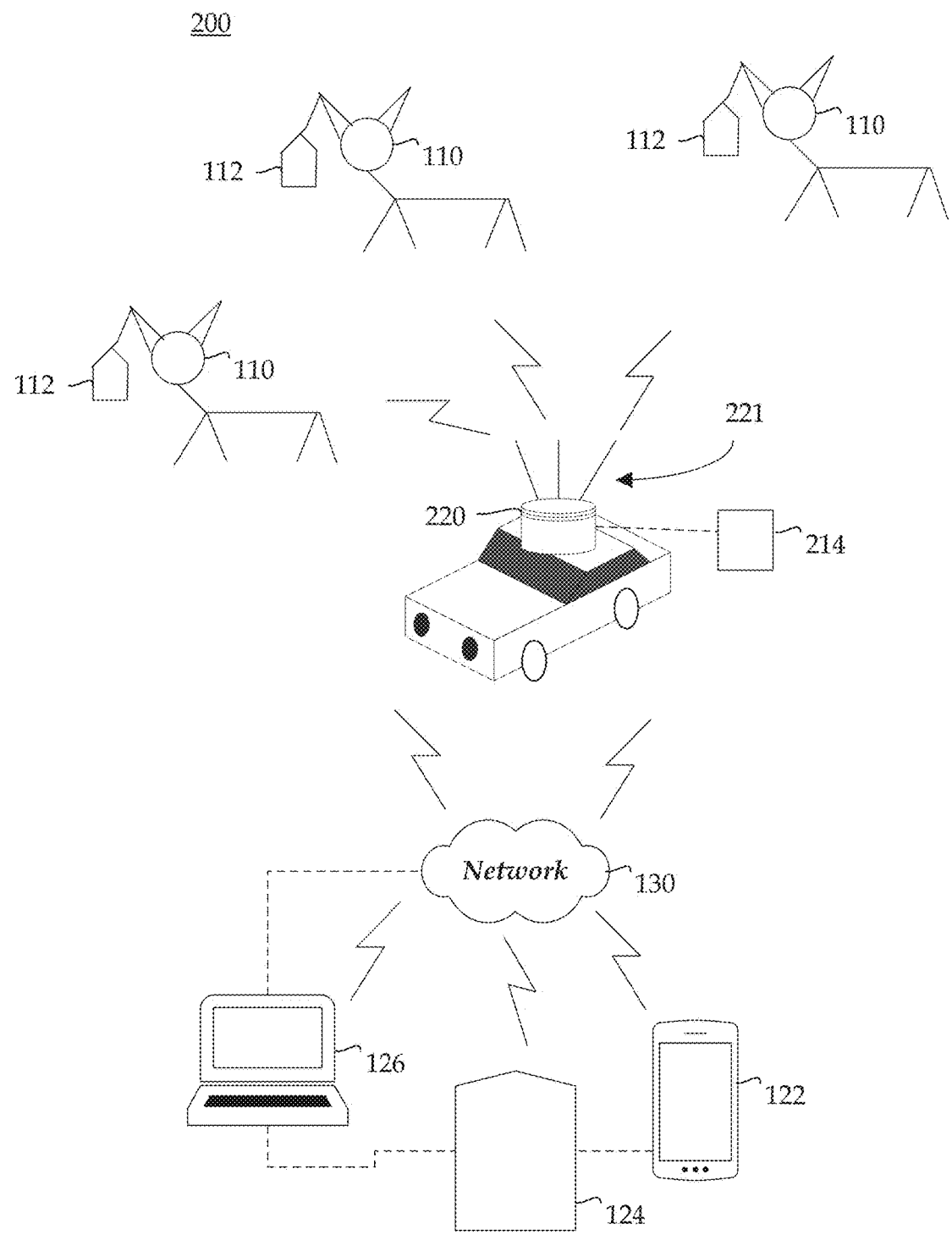
FIG. 2 a system diagram of radio frequency identification of moving assets using a mobile RFID receiver, according to another embodiment.
Figure 3:
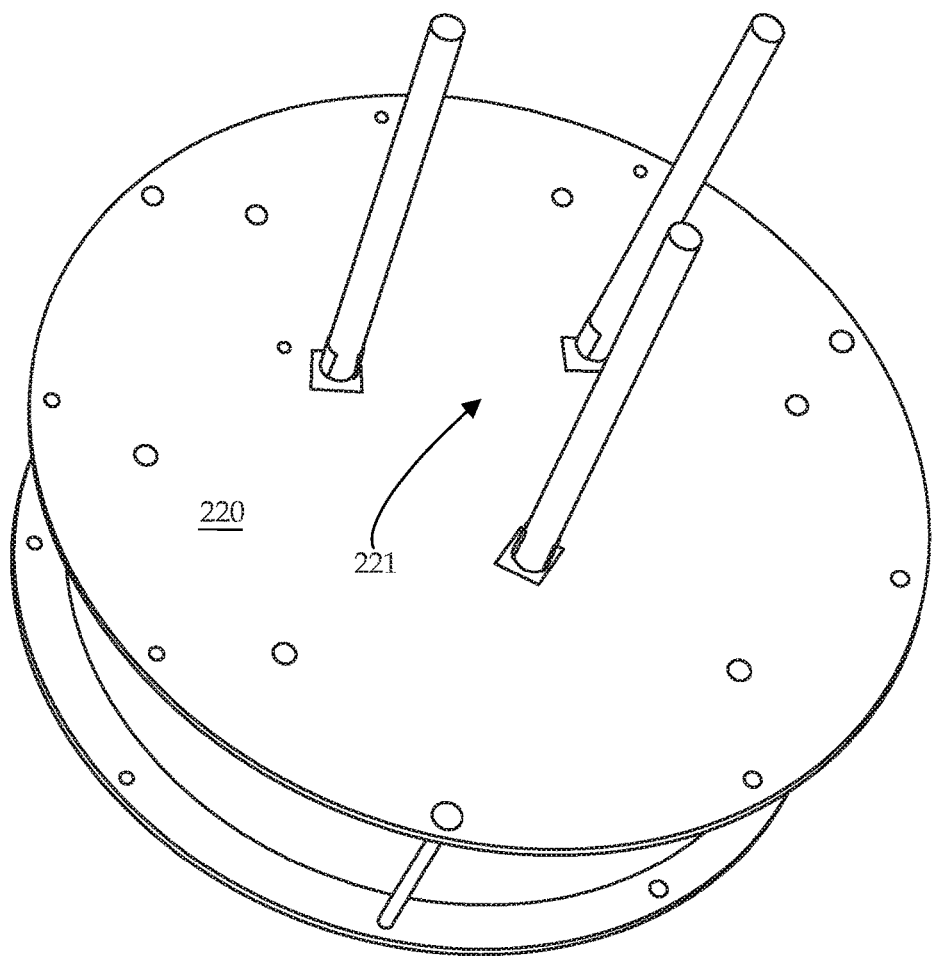
FIG. 3 is a photo of the high-power interrogator of FIG. 2, indicating use of three omnidirectional antennas.

FIG. 2 displays a system 200 of radio frequency identification of assets (similar to that of FIG. 1A but) using a mobile RFID transceiver 220, a photo of which is shown in FIG. 3. The RFID receiver 220 can include multiple antennas 221 for receiving signals from the RFID transmitter tags 112.

The RFID transceiver 220 can be attached to the top of an ATV or other vehicle, which can travel around the area of interest to collect RFID signals on a continuous basis. The RFID transceiver 220 can be deployed in multiples as well and can take the place of the RFID transceiver towers 120 where such towers have not yet been put in place, or are out of range of a certain area of interest. The RFID transceiver 220 can include or be coupled with a processing and storage unit 214 such as the storage unit 114 discussed with reference to the RFID transceiver towers 120.

To determine location, the RFID transceiver 220 can include a GPS device or capability and an inertial measurement unit (IMU), a gyroscope and/or accelerometer(s) (as does the hand-held tracker 420 discussed in FIG. 5E) to be able to continuously know its own location and orientation while receiving RFID tag signals, and compensate for its location and direction of travel to determine positions of the RFID tags 112. The RFID transceiver 220 can determine the angle of arrival (AOA), which is the direction of the incoming RFID signal relative to the multiple antenna array 221. The RFID receiver 220 can further determine the heading (direction of the multiple antenna array relative to north), and calculate a bearing angle from the RFID transceiver 220 to the RFID signal relative to north. The RFID transceiver 220 can also determine the signal power level of an incoming RFID signal and calculate a maximum range estimate from a path loss equation. The bearing angle and its uncertainty define an angular sector in which the RFID tag is positioned with the range limited by the maximum range estimate. The observations of bearing angle and/or maximum range are recorded from multiple locations relative to the RFID transceiver 220. The locations and bearing angles and/or maximum ranges of multiple observations of the RFID tags 112 can be combined to determine the position of the RFID tags.

FIG. 4 displays a system 400 of radio frequency identification of assets using a hand-held RFID tracker 420. In this embodiment, instead of RFID transceiver towers 120 or mobile RFID transceivers 220 mounted to vehicles, user(s) can use one or more hand-held RFID trackers 420 to detect and receive RFID signals from the RFID transmitter tags 112 associated with corresponding assets 110.

A user of each hand-held RFID receiver 420 can sweep from right to left and up and down to be pointed towards the assets 110 in the area of interest. The data can then be processed within the hand-held RFID tracker 420 to determine the locations and specific information with relation to the assets 110, or can alternatively send the RFID data received in the RFID signals to the computing systems 122, 124 and/or 126, which can then make the location determinations.

FIGS. 5A, 5B, 5C and 5D are several perspective views of the hand-held RFID tracker 420 of FIG. 4. FIG. 5E is a system diagram of the components and functionality of the hand-held RFID tracker 420. The hand-held RFID transceiver 420 can include a directional antenna 522 attached to a handle 524 and to an interface unit 528. The interface unit 528 can further include a display 532 for viewing and controlling settings and to view RFID data as it is received in RFID signals from the assets 110.

Figure 5E:
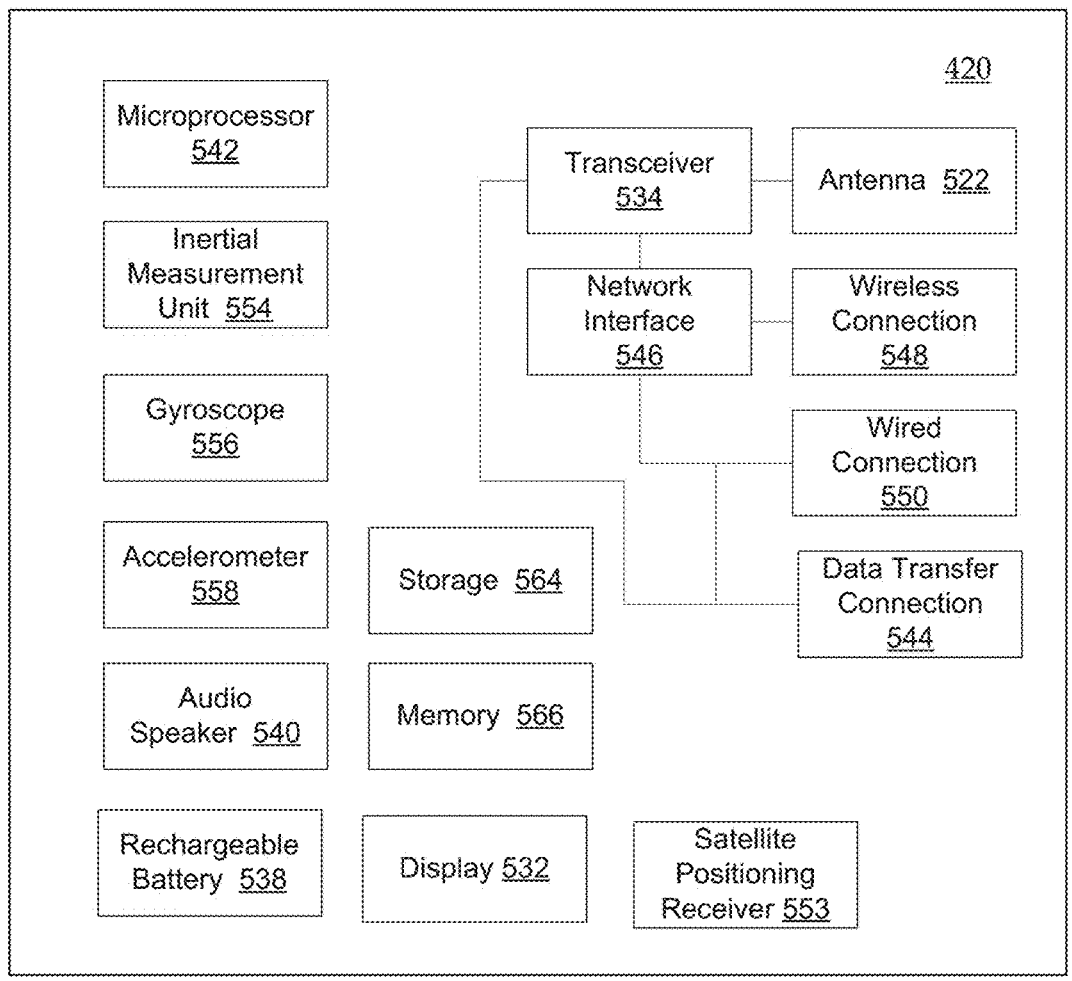
FIG. 5E is a system diagram of the components and functionality of the hand-held RFID tracker of FIG. 4, according to one embodiment of the present disclosure.

The interface unit 528 and/or the handle 524 can include the electrical components of the hand-held RFID transceiver 420, shown in detail in FIG. 5E. The hand-held RFID tracker 420 can include an RFID transceiver 534, a network interface 536, a rechargeable battery 538, an audio speaker 540, a microprocessor 542 and other electronics for interfacing with the antenna 522 and for determining location information for RFID transmitter tags 112 for which RFID signals are received. The hand-held RFID tracker can further include a data transfer connection 544 (e.g., for direct physical data transfer to a computing device), a network interface 546, a wireless connection 548, and a wired connection 550 for interfacing with the network 130. The hand-held RFID tracker 420 can further include a satellite positioning receiver 553, an inertial measurement unit (IMU) 554, a gyroscope 556 and/or an accelerometer 558 to aid in determining positioning and orientation information with relation to the assets 110 in the area of interest. The hand-held RFID tracker 420 can further include computer storage 564 and memory 566 for storing the RFID data (including location information) in the hand-held RFID receiver 420.

The directional antenna 522 can be configured to communicate through the network 130 and to transmit collected data and other information to the computing systems 122, 124 and/or 126. The hand-held RFID tracker 420 can further include a low-frequency transmitter (e.g., as part of the transceiver 534) for producing highly-responsive, short-range activation signals which can be received by an RFID tag. The transceiver 534 can transmit RFID tag command signals, record and display the RFID number and signal strength of RFID tag transmissions, and store the timestamp and data contents of RFID tag transmissions in the storage 564 for subsequent retrieval and processing.

The hand-held RFID tracker 420 can send command signals to the RFID tags 112 to change behavior of the RFID tags. For example, RFID tags which are being tracked can be commanded to transmit more frequently for a period of time to increase the number of tracking observations available to the user on the handheld tracker display 532. Also, RFID tags that are being recorded into an inventory list can be commanded to transmit more frequently and then commanded to stop reporting once the transmissions are successfully recorded.

By way of example, the RFID tags 112 can be commanded to enter a low power storage mode, which disables all transmissions to conserve tag battery and keep only the RFID tag receiver active to detect subsequent command signals. RFID tags can be commanded to wake up from low power storage mode and re-enable their RFID signal transmissions. RFID tags can be commanded by a uniquely identified station with a known signal activation radius to respond with the unique station ID in their RFID signal transmission to indicate that the tags are inside the proximity of the signal activation radius of the known station location. Command signals can be uniquely addressed to particular RFID tags (with specified unique IDs) so that the commands are ignored by RFID tags that do not match the RFID number in the command. Command signals can also be globally addressed so that all RFID tags that receive the command will respond to the command. Tag commands can contain a time duration that instructs RFID tags to change their behavior for a specific length of time before returning to their default behavior as before receiving the command.

To find an individual tag, the hand-held RFID tracker 420 can alternate between transmitting a rapid series of tag wakeup command signals and listening to receiver RFID tag transmissions. The tag wakeup command signal commands the tag with a RFID identifier matching the RFID identifier in the command signal to increase its RFID signal transmission rate for a specified period of time. RFID transmissions from the matching RFID tag can be displayed with their received signal strength and an audio sound can be generated to indicate the relative strength of the received signal and whether the matching RFID tag is relatively near or far from the hand-held RFID tracker.

After the hand-held RFID tracker 420 receives RFID tag transmission confirming that the wakeup command has been received, the wakeup commands can be transmitted less frequently to allow the receiver to spend more time listening for RFID signal transmissions. Additional wakeup commands can be sent to renew the wakeup command interval to maintain the RFID tag's increased transmission rate and prevent the tag from returning to its default, slower rate of transmission. The user can point the hand-held tracker 420 in various directions to respond to the direction and strength of RFID signal transmissions that identify the direction of the matching RFID tag and move towards the tagged asset 110 until the matching RFID tag is visually located.

The directional antenna 522 can receive RFID tag transmissions that arrive at the hand-held RFID tracker 420 from an angular sector centered in the direction that the tracker is pointed. RFID tag transmissions that arrive at the hand-held RFID tracker 420 from directions outside the directional antenna beam width are not received. A wide directional beam improves the speed of finding the direction of an RFID signal transmission when searching in all directions. A narrow directional beam improves the precision of identifying the direction of the RFID transmission. The directional antenna beam width can be selected with an intermediate value to balance search speed and directional precision.

The hand-held RFID tracker 420 can record the timestamp and contents of a RFID signal transmission. The RFID tracker can process the records to collect summary statistics such as total read count, read count per RFID, maximum or minimum or average receive strength, and RFID tag sensor data. The RFID signal timestamps, contents, and statistics can be subsequently retrieved and processed to record inventory, generate reports of animals moving in or out of a premises, or stored in a database.

Figure 6A:
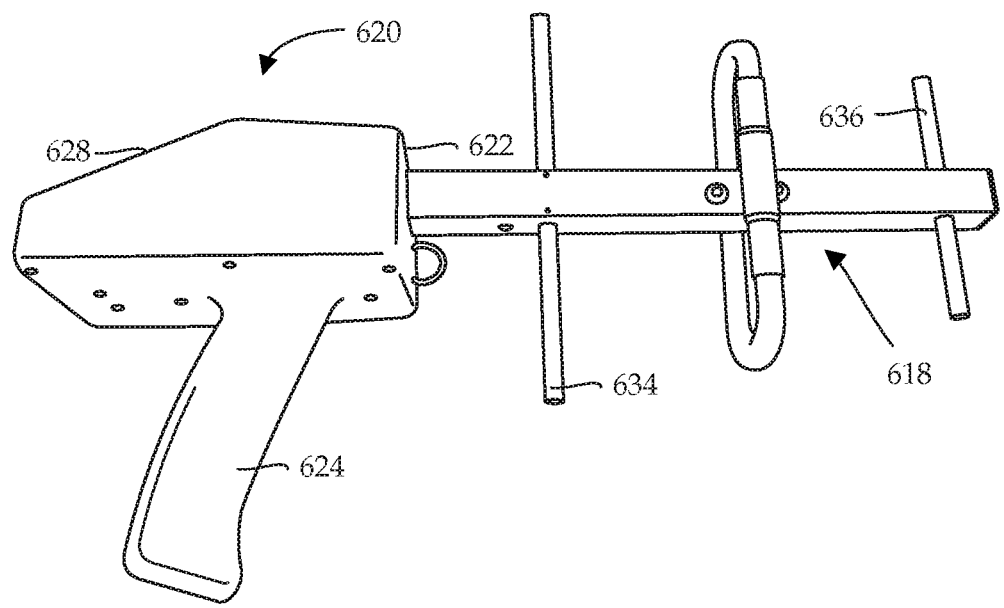
FIG. 6A is a photo of a hand-held RFID receiver using a split-beam antenna, according to one embodiment.
Figure 6B:
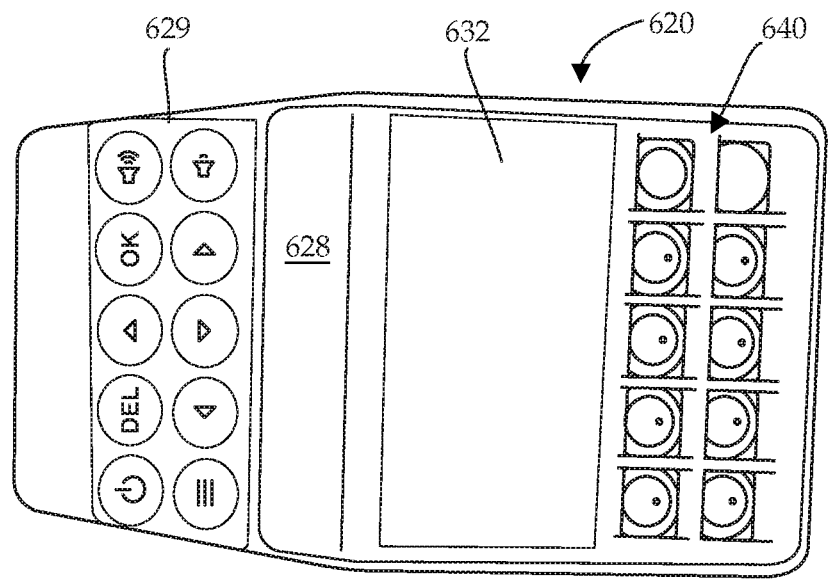
FIG. 6B is a photo of the hand-held interrogator of FIG. 6A, with a close-up view of a control interface and display.

FIG. 6A is a photo of a hand-held RFID transceiver 620 using a split-beam antenna 618. The split-beam antenna 618 can include a reflector 622, a first antenna array 634 and a second antenna array 636, among other features. The hand-held RFID transceiver 620 can include an interface unit 622 and a handle 624. The interface unit 622 can further include a control legend 629 and a control interface 640 along with a display 632 (see FIG. 6B). The control interface 640 is configured to receive user control inputs according to menu options displayed on the control legend 629. The interface unit 622 can otherwise operate similarly to the interface unit 522 of FIGS. 5A, 5B, 5C and 5D.

FIGS. 7 through 9 include views of an RFID tag housing 700 for housing the RFID transmitter tags 112 described herein. The RFID tag housing 700 can include a staged housing 702 configured at varying widths to conform to a size and shape of the tag 112. The housing 700 can further include a head 704 having a neck 708 and an aperture 712 including multiple hinged tabs 714. The hinged tabs 714 can be biased to grab onto an asset identifier tag (e.g., that includes a visual identification number) to which the RFID housing 700 can be attached. The aperture can be reinforced with a ring 718, which can also provide additional strength to the hinged tabs 714.

Figure 10:
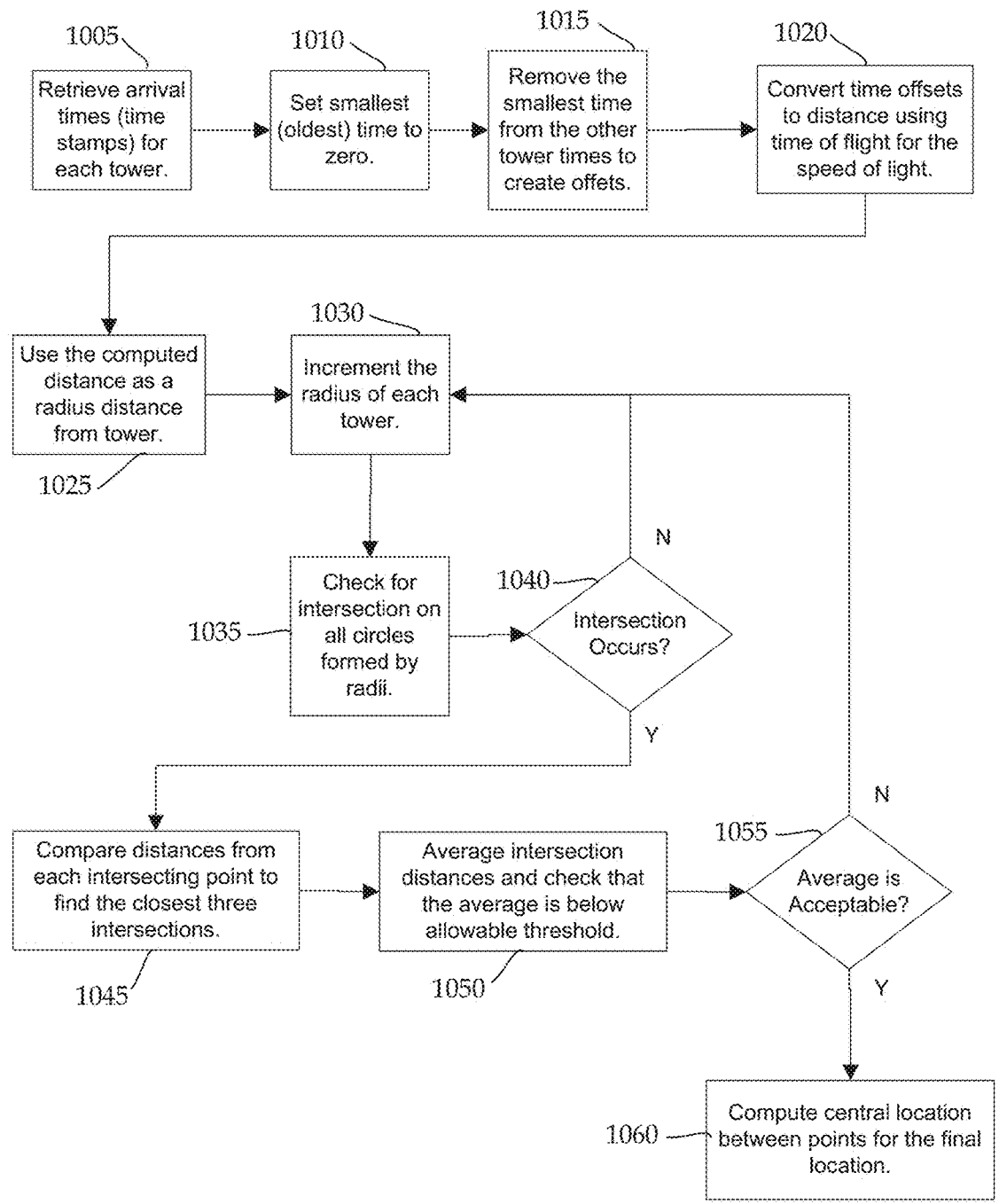
FIG. 10 is a flow chart of a method for determining an asset location from a distance of an asset tagged with an RFID tag using the system of FIG. 1A, according to one embodiment of the present disclosure.

FIG. 10 is a flow chart a method for determining an asset location from a distance of an asset 110 tagged with an RFID tag 112 using the system 100 of FIG. 1A. The method can begin with retrieving arrival times as time stamps for each RFID transceiver tower 120 (1005). The method can continue with setting the smallest (or oldest) time stamp to zero for a first (usually nearest) tower (1010). The method can continue with removing this first tower's time stamp from the arrival times of the other towers to create time offsets for the other towers (1015) and converting the time offsets to distance using time of flight for the speed of light (1020).

The method can continue with using the converted distance as a radius distance from the corresponding tower 120 (1025).

The method of FIG. 10 can continue with incrementing the radius of each tower (1030) and checking for an intersection on all circles formed by the radii (1035). The method can continue with determining whether an intersection of the radii occurs (1040). If there is no intersection, the method continues back to incrementing the radius of each tower (1030) and checking for an intersection on all circles formed by the radii (1035).

When at least three intersections do occur (1040), the method continues with comparing distances from each intersecting point to find the closest three intersections (1045). The method can continue with averaging intersection distances and checking that the average is below an allowable threshold distance (1050). The method can then determine whether the average is acceptable by accepting average intersection distances below the pre-determined threshold (1055). When the average is not acceptable, the method returns to steps 1030 and 1035 as before, continuing to form radii distance from the towers. If the average is acceptable, the method can compute the central location between points for the final location of the asset (1060).

The method of FIG. 10 can also be used with mobile RFID transceiver 220 and 420, but as discussed herein, additional calculations can be required to account for the movement of the RFID receivers themselves during the process of acquiring location data and determining the location of the tags.

Figure 11:
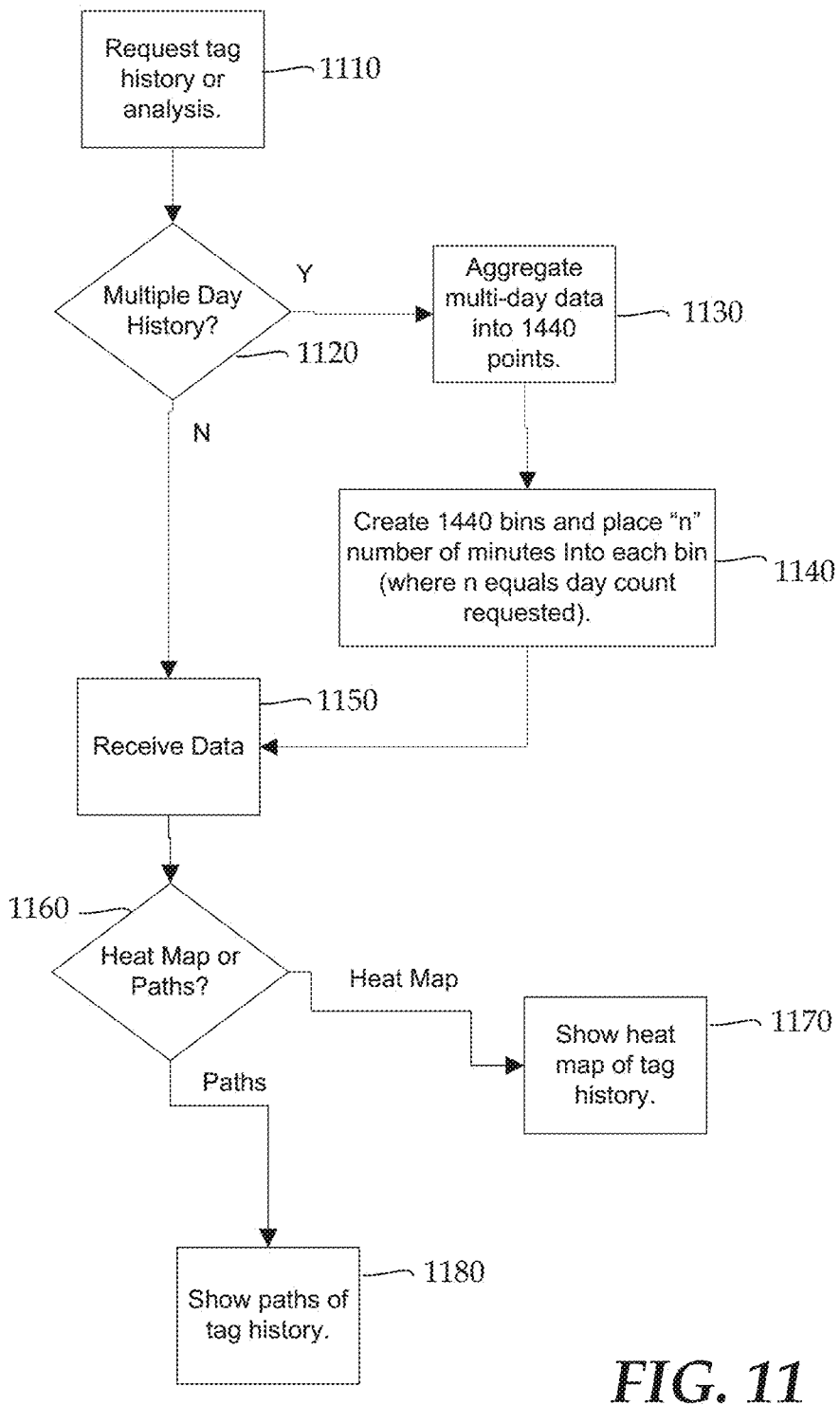
FIG. 11 is a flow chart of a method for aggregating and mapping historical tag history in a user interface, according to one embodiment of the present disclosure.

FIG. 11 is a flow chart of a method for aggregating and mapping historical tag history in a user interface. The method can be executed by a processing device of one or a combination of the computing devices 122, 124 or 126. The method can begin with requesting a tag history or an analysis based on the tag history (1110). The method can then decide whether the requested tag history is for multiple days or a single day (1120). If the answer is yes, the request is for a multi-day history, the method can aggregate location data into 1440 points, which is the number of minutes in each day (1130). In this way, changes made from minute to minute will show up in the tag history data and be capable of being mapped over time. The method can then create 1440 bins and place "n" number of minutes into each bin (where n equals the day count requested) (1140). If only one day's worth of history is requested (1120), the method can go straight to receiving the tag history data from the processing system performing the tag history analysis for that day (1150). Otherwise, binned tag history data is received for all of the multiple selected days (1150).

The method can continue by deciding whether the user has selected the heat map or the paths as a way to display the binned tag history data (1160). When the user selects (through the user interface) to display the heat map, then the method formats the data into a color-coded area on the map corresponding to historical movement of the asset (1170). Otherwise, when the user selects (through the user interface) to display paths, the method formats the data into distinguished paths on the map corresponding to specific paths taken by the asset during the selected period (1180).

Since a tag 112 can be assigned an "object" or simply be read as a tag, grouping and tracking systems can process data in relation to "objectivized" tags. Location-based tag information may only be available on the tag while metadata can be stored on an "object," for example. The object can then be tied to the tag and contain any information outside of location data. This enables the object to use multiple tags over its lifespan and tags can also reference multiple objects. More than one visual interaction algorithms can run on an object, resulting in various processed data. The processed data resulting from the executed algorithms can then be melded together to show current locations for a tag and any metadata that is available.

Figure 12:
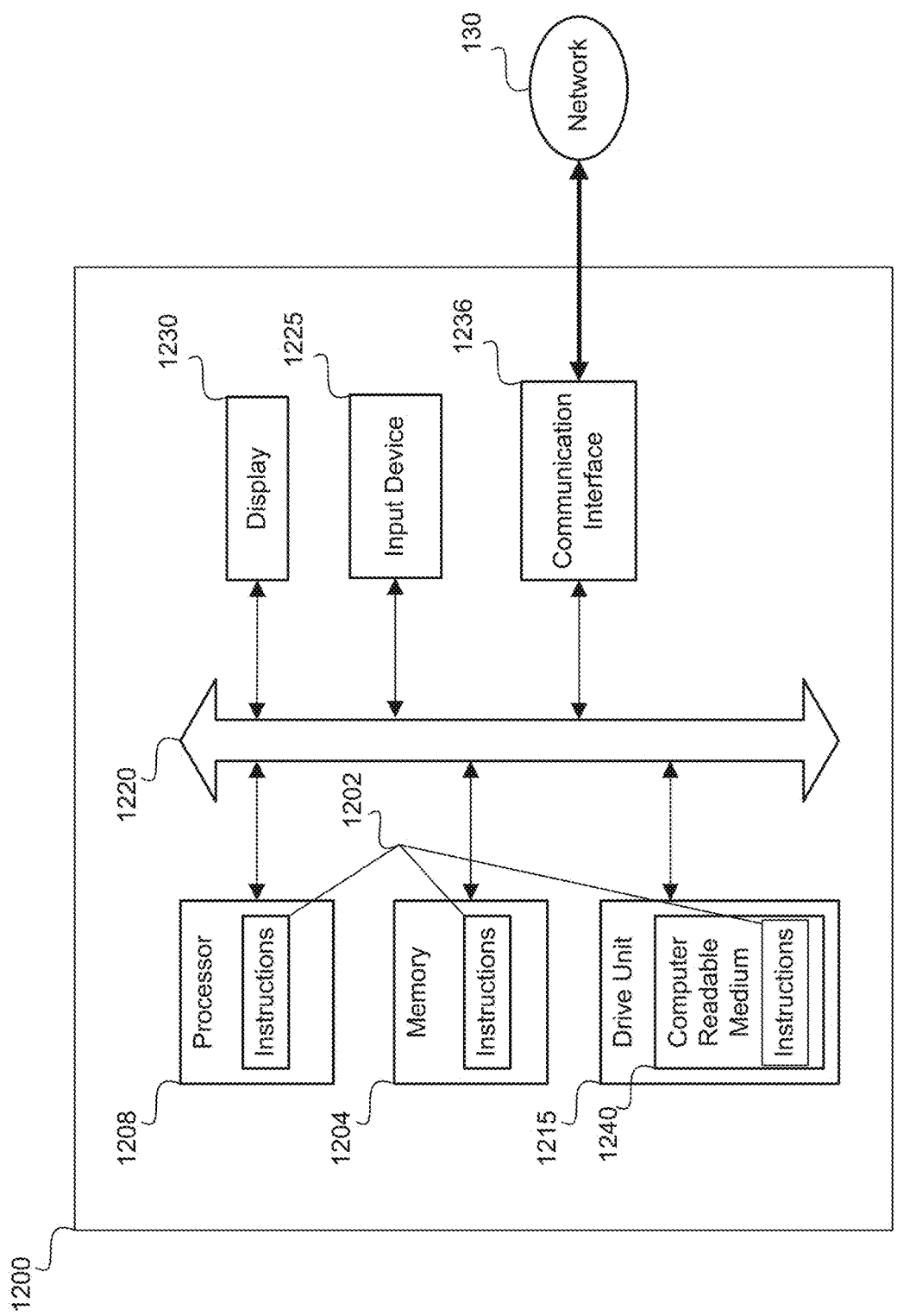
FIG. 12 illustrates a computer system, which can represent any of the computing devices referenced herein.

FIG. 12 illustrates a computer system 1200, which can represent the systems 100, 200 and 400 disclosed with reference to FIGS. 1, 2 and 4, or any other computing devices referenced herein for execution of the disclosed methods and algorithms, which when so implemented, can be a special purpose computer. The computer system 1200 can include an ordered listing of a set of instructions 1202 that can be executed to cause the computer system 1200 to perform any one or more of the methods or computer-based functions disclosed herein. The computer system 1200 can operate as a stand-alone device or can be connected to other computer systems or peripheral devices, e.g., by using a network 130.

In a networked deployment, the computer system 1200 can operate in the capacity of a server or as a client-user computer in a server-client user network environment, or as a peer computer system in a peer-to-peer (or distributed) network environment. The computer system 1200 can also be implemented as or incorporated into various devices, such as a personal computer or a mobile computing device capable of executing a set of instructions 1202 that specify actions to be taken by that machine, including and not limited to, accessing the internet or web through any form of browser. Further, each of the systems described can include any collection of sub-systems that individually or jointly execute a set, or multiple sets, of instructions to perform one or more computer functions.

The computer system 1200 can include a memory 1204 on a bus 1220 for communicating information. Code operable to cause the computer system to perform any of the acts or operations described herein can be stored in the memory 1204. The memory 1204 can be a random-access memory, read-only memory, programmable memory, hard disk drive or any other type of volatile or non-volatile memory or storage device.

The computer system 1200 can include a processor 1208, such as a central processing unit (CPU) and/or a graphics processing unit (GPU). The processor 1208 can include one or more general processors, digital signal processors, application specific integrated circuits, field programmable gate arrays, digital circuits, optical circuits, analog circuits, combinations thereof, or other now known or later-developed devices for analyzing and processing data. The processor 1208 can implement the set of instructions 1202 or other software program, such as manually-programmed or computer-generated code for implementing logical functions. The logical function or any system element described can, among other functions, process and/or convert an analog data source such as an analog electrical, audio, or video signal, or a combination thereof, to a digital data source for audio-visual purposes or other digital processing purposes such as for compatibility for computer processing.

The computer system 1200 can also include a disk or optical drive unit 1215. The disk drive unit 1215 can include a computer-readable medium 1240 in which one or more sets of instructions 1202, e.g., software, can be embedded. Further, the instructions 1202 can perform one or more of the operations as described herein. The instructions 1202 can reside completely, or at least partially, within the memory 1204 and/or within the processor 1208 during execution by the computer system 1200. Accordingly, databases configured to store data generated from execution of the disclosed methods and algorithms can be stored in the memory 1204 and/or the disk unit 1215.

The memory 1204 and the processor 1208 also can include computer-readable media as discussed above. A "computer-readable medium," "computer-readable storage medium," "machine readable medium," "propagated-signal medium," and/or "signal-bearing medium" can include any device that includes, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 1200 can include an input device 1225, such as a keyboard or mouse, configured for a user to interact with any of the components of system 1200. It can further include a display 1230, such as a liquid crystal display (LCD), a cathode ray tube (CRT), or any other display suitable for conveying information. The display 1230 can act as an interface for the user to see the functioning of the processor 1208, or specifically as an interface with the software stored in the memory 1204 or the drive unit 1215.

The computer system 1200 can include a communication interface 1236 that enables communications via the communications network 130. The network 130 can include wired networks, wireless networks, or combinations thereof. The communication interface 1236 network can enable communications via any number of communication standards, such as 802.11, 802.17, 802.20, WiMax, cellular telephone standards, or other communication standards.

Accordingly, the method and system can be realized in hardware, software, or a combination of hardware and software. The method and system can be realized in a centralized fashion in at least one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. Such a programmed computer can be considered a special-purpose computer.

The method and system can also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A radio frequency identification (RFID) tag comprising:
 a power source;
 a transmitter coupled to the power source;
 a receiver operatively coupled to the transmitter and to the power source, the receiver to receive low-frequency signals from an active RFID transceiver located within a vicinity of the receiver, wherein the transmitter is activated by the power source responsive to the receiver receiving a wake up command at a predetermined low frequency from the active RFID transceiver; and
 a processor coupled to the transmitter and the receiver, the processor to, responsive to being activated by the wake up command:
  detect a specific command located in data received within a high-frequency signal from the active RFID transceiver, the specific command being different than the wake up command; and
  cause one of the transmitter or the receiver to take an action in response to the specific command.

2. The RFID tag of claim 1, wherein the predetermined low frequency is 150 KHz or less, and the wake up command is a low duty-cycle command of less than a 50% duty cycle.

3. The RFID tag of claim 1, further comprising a non-transitory computer-readable medium storing instructions and coupled to the processor, wherein the processor is to execute the instructions to cause the transmitter to respond, when commanded by the active RFID transceiver, by transmitting a response signal including requested data.

4. The RFID tag of claim 1, further comprising a processor operatively coupled to the transmitter, the processor to execute pre-stored instructions responsive to the receiver receiving the wake up command.

5. The RFID tag of claim 1, wherein the receiver is to receive a station identifier (ID) from the active RFID transceiver in the low-frequency signals, and responsive to the station ID, the transmitter is to retransmit the station ID in a data packet, to indicate proximity to the active RFID transceiver.

6. The RFID tag of claim 1, wherein the action is to direct the transmitter to transmit at a specific transmission rate for a predetermined period of time.

7. The RFID tag of claim 1, wherein the action is to direct the transmitter to transmit a unique identifier more frequently or less frequently.

8. The RFID tag of claim 1, wherein the action is to:
 direct the transmitter to disable all transmissions to conserve the power source; and
 direct the receiver to remain active to detect further commands from the active RFID transceiver.

9. The RFID tag of claim 1, wherein the active RFID transceiver is a first active RFID transceiver, further comprising a processor to:
 once awake, detect second data in second a high-frequency signal received from a second active RFID transceiver located at least a mile away; and
 determine a second action to take based on a second specific command located within the second data.

10. A radio frequency identification (RFID) tag comprising:
 a power source;
 a transmitter coupled to the power source, the transmitter to transmit a unique identifier and to respond to commands after being activated;
 a receiver operatively coupled to the transmitter and to receive a high-frequency signal from an active RFID transceiver in response to being activated by a low-frequency wake up command from the active RFID transceiver;
 a non-transitory computer-readable medium storing instructions; and
 a processor coupled to the transmitter, the receiver, and the non-transitory computer-readable medium, the processor to execute the instructions to:
  detect a specific command located in data received within the high-frequency signal, the specific command being different than the wake up command; and
  cause one of the transmitter or the receiver to take an action in response to the specific command.

11. The RFID tag of claim 10, further comprising a sensor to gather environmental data, and wherein the processor is further to direct the transmitter to transmit the environmental data from the sensor to the active RFID transceiver.

12. The RFID tag of claim 10, further comprising a location sensor to gather location-based information, and wherein the processor is further to direct the transmitter to transmit the location-based information from the sensor to the active RFID transceiver.

13. The RFID tag of claim 10, wherein the processor is further to execute the action by directing the transmitter to transmit at a specific transmission rate for a predetermined period of time.

14. The RFID tag of claim 10, wherein the processor is further to execute the action by directing the transmitter to transmit the unique identifier more frequently or less frequently.

15. The RFID tag of claim 10, wherein the action is to:
 direct the transmitter to disable all transmissions to conserve the power source; and
 direct the receiver to remain active to detect further commands from the active RFID transceiver.

16. The RFID tag of claim 10, wherein the action is to direct the transmitter to cease transmission of sensor data.

17. The RFID tag of claim 1, wherein the action is to direct the transmitter to cease transmission of one of a station identifier or an RFID identifier.

18. An active radio frequency identification (RFID) transceiver comprising:
 an antenna;
 a transmitter coupled to the antenna, the transmitter to transmit both low-frequency signals and high-frequency signals;
 a receiver coupled to the antenna; and
 a processing device operatively coupled to the transmitter and the receiver, the processing device to:
  initiate, through the transmitter, transmission of a wake up command at a predetermined low frequency, the wake up command to activate an RFID tag; and
  responsive to detection, through the receiver, of the RFID tag beginning to transmit a second signal upon activation, cause the transmitter to transmit a specific command in data sent in a high-frequency signal from the transmitter, wherein the specific command is to cause the RFID tag to perform an action.

19. The active RFID transceiver of claim 18, wherein the predetermined low frequency is 150 KHz or less, and the wake up command is a low duty-cycle command of less than a 50% duty cycle.

20. The active RFID transceiver of claim 18, wherein the wake up command is a station identifier (ID), and includes a second command to retransmit the station ID to other RFID tags.

21. The active RFID transceiver of claim 18, wherein the action is to direct a tag transmitter to transmit at a specific transmission rate for a predetermined period of time.

22. The active RFID transceiver of claim 18, wherein the action is to direct a tag transmitter to transmit a unique identifier more frequently or less frequently.

23. The active RFID transceiver of claim 18, wherein the action is to:
- direct a tag transmitter to disable all transmissions to conserve power; and
- direct a tag receiver to remain active to detect further commands.

24. The active RFID transceiver of claim 18, wherein the action is to direct a tag transmitter to cease transmission of one of a station identifier or an RFID identifier.

\* \* \* \* \*